United States Patent [19]

Kreis et al.

[11] Patent Number: 5,344,187
[45] Date of Patent: Sep. 6, 1994

[54] SPRING STRUT MOUNTING ASSEMBLY OF A VEHICLE BODY

[75] Inventors: Gundolf Kreis, Oberstimm; Heinrich Timm, Ingolstadt, both of Fed. Rep. of Germany

[73] Assignee: Audi A.G., Fed. Rep. of Germany

[21] Appl. No.: 78,183

[22] PCT Filed: Nov. 8, 1991

[86] PCT No.: PCT/EP91/02115
§ 371 Date: Jun. 18, 1992
§ 102(e) Date: Jun. 18, 1992

[87] PCT Pub. No.: WO92/11143
PCT Pub. Date: Jul. 9, 1992

[30] Foreign Application Priority Data

Dec. 20, 1990 [DE] Fed. Rep. of Germany ....... 4040957

[51] Int. Cl.$^5$ .................... B62D 21/11; B62D 23/00; B60G 15/06
[52] U.S. Cl. .................... 280/788; 296/194; 296/205; 296/29; 280/692
[58] Field of Search .............. 280/788, 668, 672, 692, 280/693, 697, 698; 296/194, 203, 204, 205, 29

[56] References Cited

U.S. PATENT DOCUMENTS

| | | | |
|---|---|---|---|
| 1,542,510 | 6/1925 | Lancia | 280/788 |
| 2,047,336 | 7/1936 | Stout . | |
| 2,507,421 | 5/1950 | Rose | 296/205 |
| 4,811,812 | 3/1989 | Cassese | 280/788 |
| 5,085,484 | 2/1992 | Mori | 280/788 |
| 5,244,248 | 9/1993 | Bovellan | 296/194 |

FOREIGN PATENT DOCUMENTS 0968706 3/1958 Fed. Rep. of Germany .
3346986 7/1985 Fed. Rep. of Germany .

*Primary Examiner*—Margaret A. Focarino
*Assistant Examiner*—Peter English
*Attorney, Agent, or Firm*—Thomas C. Feix

[57] ABSTRACT

A spring strut mounting assembly for fitting on a vehicle body which includes a spring strut having a bearing block mounted at the top end thereof on which elements of the running gear, such as a damper, a spring and link arms, can also be pre-mounted. Support members for attachment to the vehicle body adjacent the location for the suspension strut mounting assembly are provided and have converging free ends which define three boundary points of a free space region for mounting the upper bearing block of the spring strut. The upper bearing block is joined directly to these support members without the need for the conventional spring strut cup which is normally fixed to the vehicle body. In a preferred embodiment of the invention, the support members are aluminum extrusions and the converging free ends are each cut at an oblique angle to provide suitable large contact surfaces for mounting to the corresponding receiving flanges of the upper bearing block of the suspension strut. The upper bearing block of the spring strut is bolted directly to the free ends of the aluminum-extrusion support members.

7 Claims, 2 Drawing Sheets

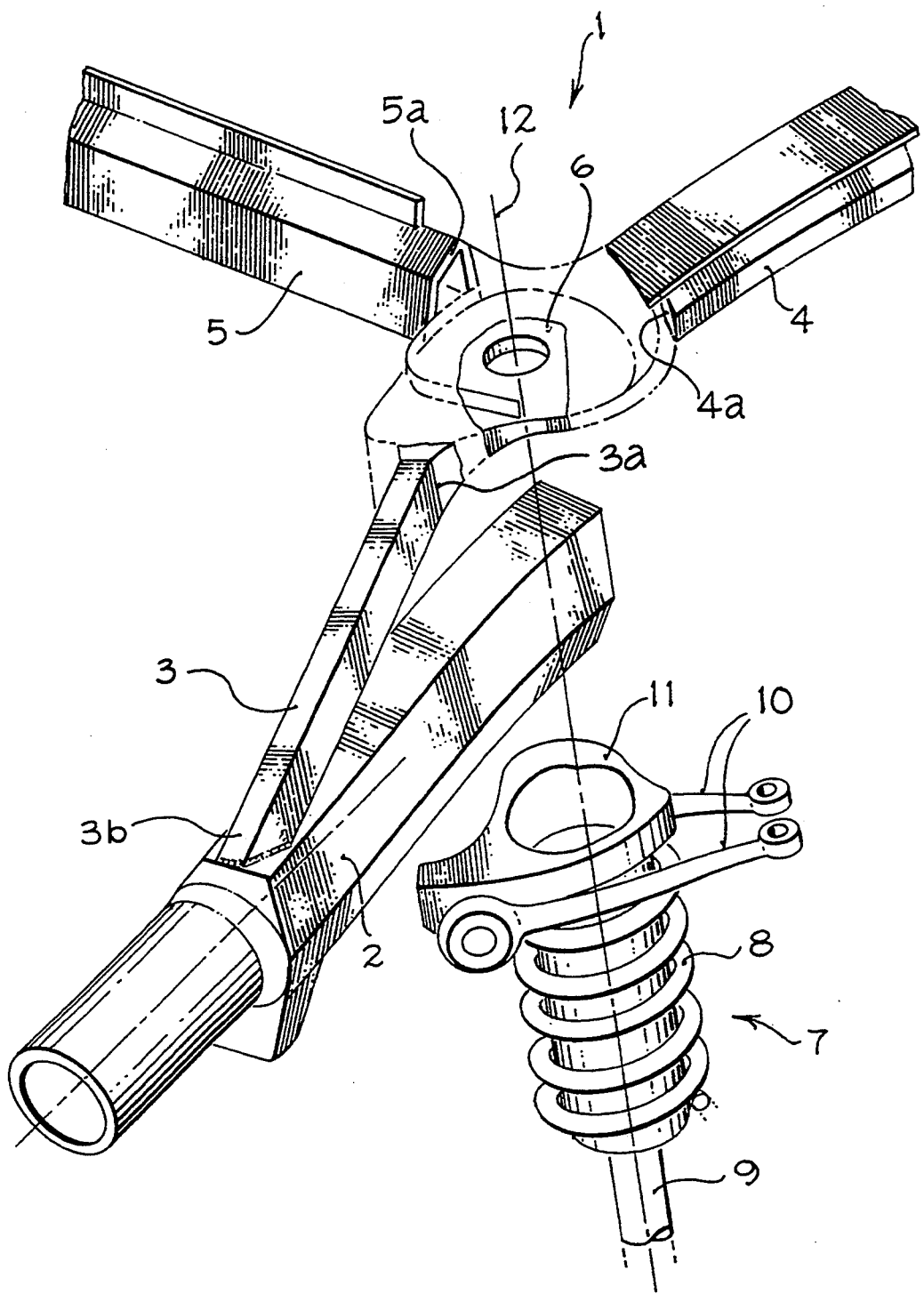
FIG_1

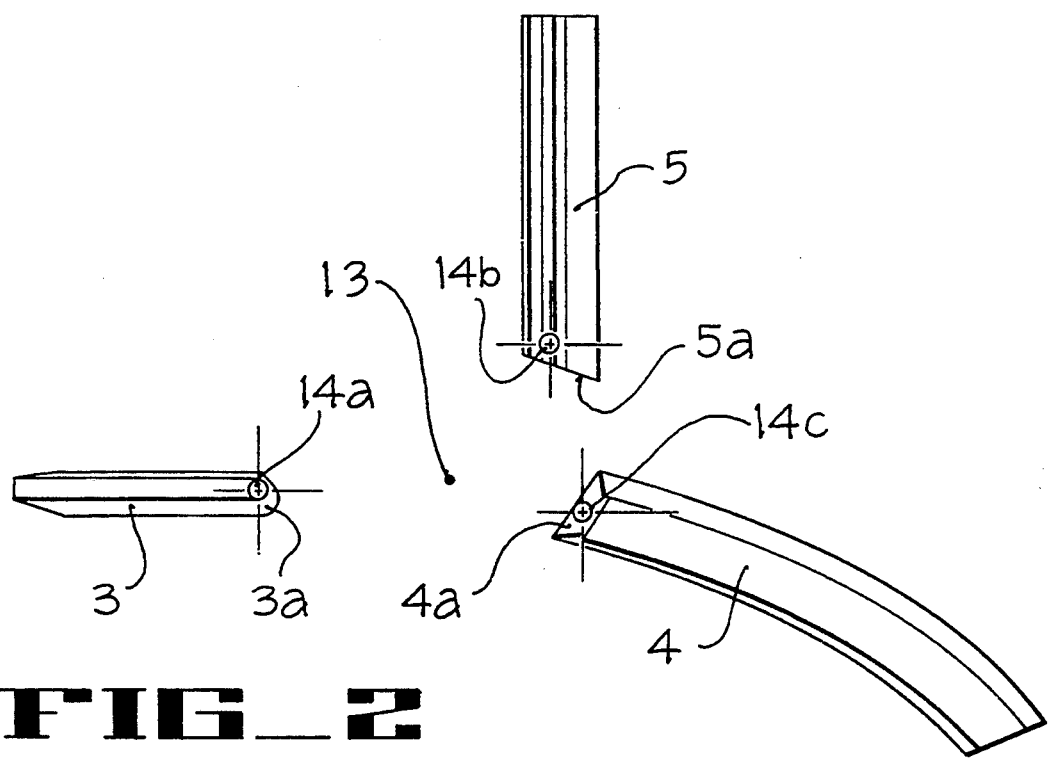
FIG_2
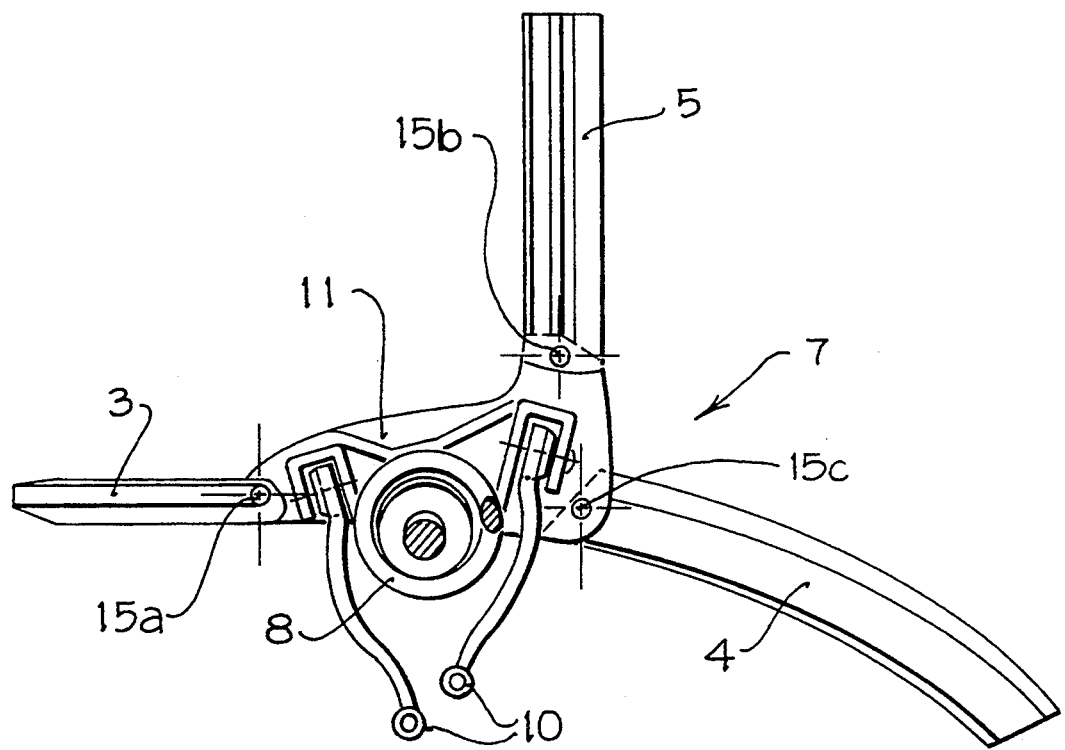
FIG_3

SPRING STRUT MOUNTING ASSEMBLY OF A VEHICLE BODY

FIELD

The invention relates to improvements in vehicle body fabrication, and more particularly to an improved spring strut mounting assembly in a vehicle bodywork.

BACKGROUND

In the customary series production of motor vehicles, the entire running gear is pre-assembled, fitted and bolted into the body of the vehicle from below. A bearing block, generally in the form of a casting, is installed at the upper end of a spring strut assembly of the running gear. Other elements of the running gear, such as dampers or shock-absorbers, springs, links etc., are pre-assembled onto the bearing block.

Supporting members, typically made from sheet-metal construction, are provided to the vehicle body in the region of the spring strut mounting assembly to secure a spring strut cup on the body. The spring strut cup is usually fabricated as a casting.

During the assembly of the vehicle body and the running gear, the bearing block of the spring strut assembly is brought in contact with and bolted to the spring strut cup on the body.

The spring strut cup and bearing block construction in the customary series production of motor vehicles is expensive and is necessitated by the above described pre-assembly operations.

THE INVENTION

Objects

It is therefore a principle object of the present invention to provide an improved spring strut mounting assembly which is similar to mountings seen in the prior art, but which eliminates the need for a conventional spring strut cup and therefore is simpler in construction and less expensive.

Other or further objects will become evident from the following detailed description, drawings and appended claims.

DRAWINGS

An exemplary embodiment of the invention with further details, features and advantages is explained with greater detail with reference to the drawings, in which:

FIG. 1 is an exploded isometric view of a forward spring strut mounting assembly 1 for a vehicle body constructed in accordance with a preferred embodiment of the present invention and illustrating assembly without the need for a prior art spring strut cup 6 (shown in phantom);

FIG. 2 is a plan view of the spring strut mounting assembly 1 illustrated in FIG. 1, with the spring strut 7 and longitudinal member 2 removed for clarity; and FIG. 3 is a view generally similar to the view illustrated in FIG. 2 except that the spring strut 7 with its bearing block 11 have been mounted into a free space 13 and attached to free ends 3a, 4a, 5a of members 3, 4, 5 via fasteners extended through holes 15a, 15b, 15c formed in the upper bearing block 11.

SUMMARY

According to the invention, a spring strut mounting assembly for a motor vehicle includes supporting members for mounting to the vehicle body and configured relative to each other such that the converging free ends of each corresponding supporting member define three boundary points along a free space region for mounting an upper bearing block of a spring strut. In this manner, the upper bearing block may be directly disposed in the free space region and connected to the free ends of each of the supporting members which bound the free space region. As a result, a spring strut cup attached to the body, normally used in the prior art and disposed in the free space region, can be dispensed with completely.

This does not entail any functional disadvantages since in the prior art embodiments, two parts (the bearing block on the spring strut, and the spring strut cup attached to the body) are superimposed and bolted together. In the present invention, only one part (i.e., the bearing block) is necessary, particularly if both parts are designed as light metal castings.

Despite the elimination of the spring strut cup attached to the body, there is virtually no extra effort involved in the assembly procedure since the bearing block on the spring strut is now bolted directly to the supporting frame parts rather than to the spring strut cup.

In theory, it is possible to eliminate the spring strut cup from the spring strut mounting assembly in most vehicle body constructions. For example, in the case of large-area reinforced sheet-metal constructions, the spring strut cup may be eliminated.

However, it is advantageous to employ the invention where structural members are used at the spring strut mounting assembly to provide support on the body. The structural members are directed towards one another with their converging free ends defining three points on the boundary of the free space region for mounting the spring strut bearing block. The bearing block contacts the free ends and is bolted thereto.

Pre-assembly of a vehicle body without spring strut cups on the body can be carried out in a convenient and advantageous manner in the case of aluminum vehicle bodies. The supporting members of the present invention may comprise aluminum extruded-section members, and the upper bearing block may be in the form of an aluminum casting. Further, it is advantageous if the ends of the members are cut off obliquely, thereby providing large contact surfaces for engagement with the bearing block.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 shows a front spring strut mounting assembly 1 for a vehicle body (not shown). Part of a lower bearer member 2 of the vehicle front end is depicted. The bearer member 2 is generally oriented in the longitudinal direction of the vehicle and is attached (attachment not shown) to the vehicle body. A support member 3 is attached at its lower end 3b to the longitudinal bearer member 2 and extends obliquely upwards therefrom terminating in a free end 3a. Another support member 4 is attached at its rearward end to a rearwardly disposed A-pillar or forward door post (not shown) and extends generally forwardly and downwardly therefrom and terminates at free end 4a. FIG. 1 also illustrates a cross-member 5 which is attached (not shown) to the vehicle body and extends transversely across it, terminating at a free end 5a.

In the preferred embodiment of the invention, the frame members 2, 3, 4, 5 are constructed of aluminum-extruded sections. However, it will be appreciated that other constructions for the support members are possible, such as for example, conventional sheet metal stampings. The mutually facing free ends 3a, 4a, 5a of the support members 3, 4, 5 define three points along a boundary of a free space region in which, according to the prior art, a spring strut cup 6 (shown in phantom) is normally arranged and secured.

Shown beneath the arrangement of members representing the vehicle body region is an upper part of a spring strut 7, having a spring 8, a damper or shock-absorber 9, and links 10. The spring 8, the damper 9 and the links 10 are fastened onto an upper bearing block 11 disposed at the top of the spring strut 7. The spring 8, damper 9, and links 10 are assembled on the block 11 before the spring strut 7 is attached to the members 3, 4, 5. The spring strut 7 is part of a running gear (not shown) which is typically pre-assembled as a whole unit and fitted to the vehicle body from below, along the line 12. According to assembly procedure of the prior art, the bearing block 11 is brought into contact against a spring strut cup 6 (shown in phantom) provided to the wheel well of the vehicle body, whereupon both parts are bolted together.

FIG. 2 is a plan view of the arrangement illustrated in FIG. 1 wherein the spring strut 7 and the longitudinal bearer member 2 are omitted for clarity. In this view, the mutually facing free ends 3a, 4a, 5a of the support members 3, 4, 5 define a boundary about a free space region 13. The upper bearing block 11 is disposed within the free space region 13. Holes 14a, 14b, 14c sized for receiving fasteners (not shown) are provided at each of the free ends 3a, 4a, 5a of the support members 3, 4, 5.

FIG. 3 is a plan view illustrating the arrangement depicted in FIG. 2 wherein the spring strut 7 is disposed within the free space region 13 and attached to the support members 3, 4, 5. The bearing block 11, the spring 8 and the links 10 can also be seen. At the location of the holes 14a, 14b, 14c in the support members 3, 4, 5 the bearing block 11 has corresponding holes 15a, 15b, 15c. Fasteners (not shown) may be inserted through the coaligned holes 15a, 15b, 15c and 14a, 14b, 14c in the bearing block 11 and the members 3, 4, 5, respectively, to fasten the bearing block 11 to the members as illustrated in assembled form. In the alternative embodiment, the holes may be threaded to accommodate threaded fasteners (not shown).

As can be seen from FIGS. 2 and 3, the ends 3a, 4a, 5a of the members 3, 4, 5 are preferably cut off at an oblique angle, thereby creating a large contact surface for engagement with the bearing block 11 and allowing good compensational tolerances by virtue of the associated wedge.

In the case of an aluminum vehicle body with members 3, 4, 5 fabricated from aluminum-extruded sections, it is particularly simple and convenient to produce the spring strut mounting assembly without a spring strut cup, i.e., with free member ends.

In the preferred embodiment, the bearing block 11 is fabricated as a light metal casting. This provides adequate support and stiffness for the spring strut without the spring strut cup and thereby permits cost savings to be realized.

It should be understood that various modifications within the scope of this invention can be made by one of ordinary skill in the art without departing from the spirit thereof. We therefore wish our invention to be defined by the scope of the appended claims as broadly as prior art will permit, and in view of the specification as need be.

We claim:

1. In a vehicle body, an assembly for mounting a spring strut to the vehicle body wherein the spring strut includes a bearing block at an upper end thereof and wherein the bearing block is adapted for preassembly of vehicle suspension elements including dampers, springs and links, the mounting assembly comprising in operative combination:
    a) a plurality of suspension strut assembly support members, each of said support members having a first end connected to the vehicle body and a second end; and wherein said plurality of support members includes:
        i) an obliquely angled first support member which extends rearwardly and upwardly from its first end connection at a lower longitudinal bearer member towards a free space region;
        ii) a second transversely oriented support member which extends horizontally outward from its first end connection at a central interior region of the vehicle body towards said free space region;
        iii) a third longitudinally oriented support member which extends forwardly and downwardly from its first end connection at an A pillar of the vehicle body towards said free space region;
    b) each of said support members converge a distance towards a common vertical axis such that their corresponding second ends define a plurality of boundary points along said free space region located at a desired position in space relative to the vehicle body for supporting the bearing block of the spring strut; and
    c) means for connecting said second ends of said support members directly to said bearing block.

2. A spring strut mounting assembly as in claim 1 wherein:
    a) said first, second and third support members comprise light metal extruded sections; and
    b) said bearing block comprises a light metal casting.

3. A spring strut mounting assembly as in claim 2 wherein said connecting means comprise bolt fasteners.

4. A spring strut mounting assembly as in claim 3 herein the second ends of said first, second and third support members are each cut at an oblique angle to provide sufficiently large contact surfaces for connection to the bearing block.

5. A spring strut mounting assembly as in claim 1 wherein said connecting means comprise bolt fasteners.

6. A spring strut mounting assembly as in claim 5 wherein the second ends of said first, second and third support members are each cut at an oblique angle to provide sufficiently large contact surfaces for connection to the bearing block.

7. A spring strut mounting assembly as in claim 1 wherein the second ends of said first, second, and third support members are each cut at an oblique angle to provide sufficiently large contact surfaces for connection to the bearing block.

* * * * *

UNITED STATES PATENT AND TRADEMARK OFFICE
CERTIFICATE OF CORRECTION

PATENT NO. : 5,344,187
DATED : September 6, 1994
INVENTOR(S) : Gundolf Kreis et al.

It is certified that error appears in the above-indentified patent and that said Letters Patent is hereby corrected as shown below:

On the title page: ITEM "[86]", the dates following "371 Date" and "102(e) Date" - delete "June 18, 1992 ' and insert --June 18, 1993--;

Column 4, line 53, delete "herein" and insert --wherein--.

Signed and Sealed this

Fourth Day of April, 1995

Attest:

BRUCE LEHMAN

Attesting Officer        Commissioner of Patents and Trademarks